July 26, 1960     B. GITTELSON     2,946,125
BUST MEASURING DEVICE

Filed Dec. 17, 1957     2 Sheets-Sheet 1

INVENTOR.
BERNARD GITTELSON

BY his ATTORNEYS.

July 26, 1960  B. GITTELSON  2,946,125
BUST MEASURING DEVICE

Filed Dec. 17, 1957  2 Sheets-Sheet 2

INVENTOR.
BERNARD GITTELSON
BY
Brumbaugh, Free, Graves + Donohue
his   ATTORNEYS.

2,946,125
BUST MEASURING DEVICE

Bernard Gittelson, Cedarhurst, N.Y., assignor, by mesne assignments, to Triumph-Universa G.m.b.H., Bern, Switzerland, a company of Switzerland Filed Dec. 17, 1957, Ser. No. 703,397

5 Claims. (Cl. 33—2)

The present invention relates to measuring devices and, more particularly, to devices for taking bust measurements for the purpose of securing proper fit of garments such as brassieres.

In general, the manner in which these measurements are now taken consists in taking the bust and under-bust measurements and in relating these two measurements in such fashion as to give an indication of the cup sizes for brassieres. Among the most common objections to this manner of determining the proper sizes of brassieres are difficulties resulting from the point of the brassiere cup being either higher or lower than the nipple, or placed too far laterally in either horizontal direction from the nipple; and the difficulties resulting from incorrect location of the peripheries of the cups with respect to the border lines of the breast muscles.

In accordance with the present invention, one object is to provide a measuring device by means of which proper measurements may be made in order to determine the proper sizes and shapes of brassieres.

A further object of the invention is to provide a device of the above character which is easily applied for the purpose of making measurements and readily manipulated to provide accurate measurements of all dimensions necessary to be observed in order to determine the proper fit of garments.

Figure 1:
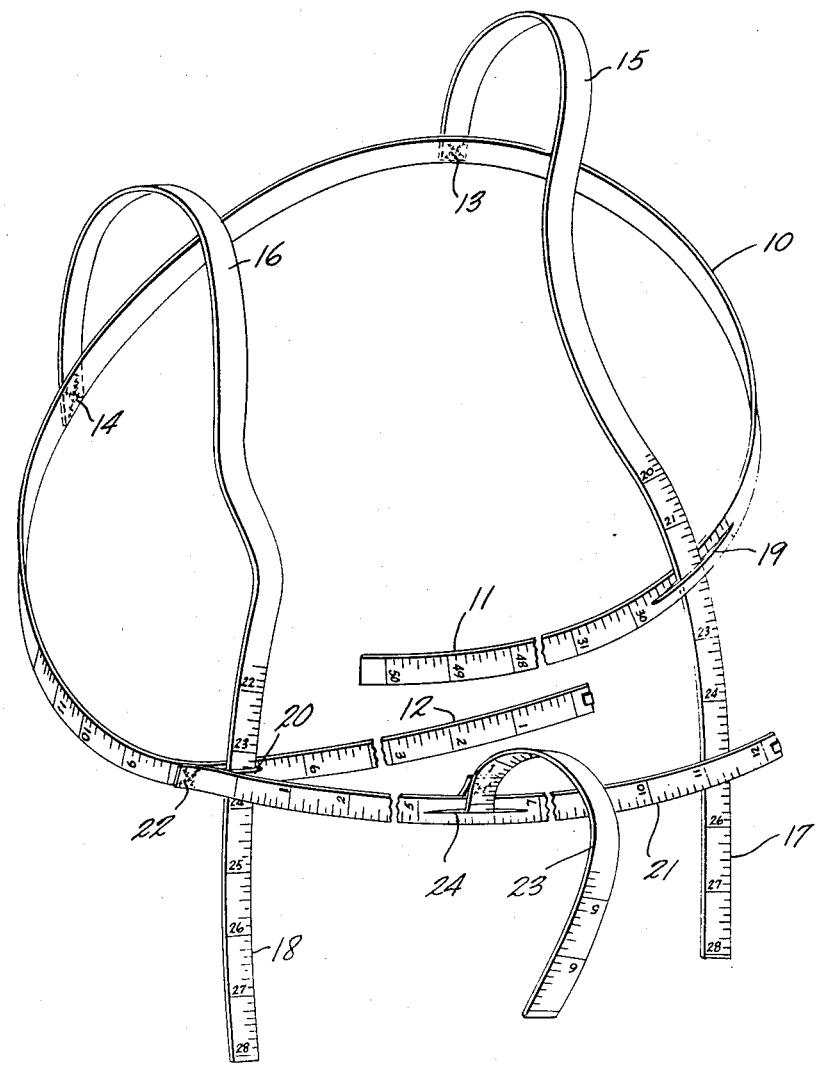
Figure 2:
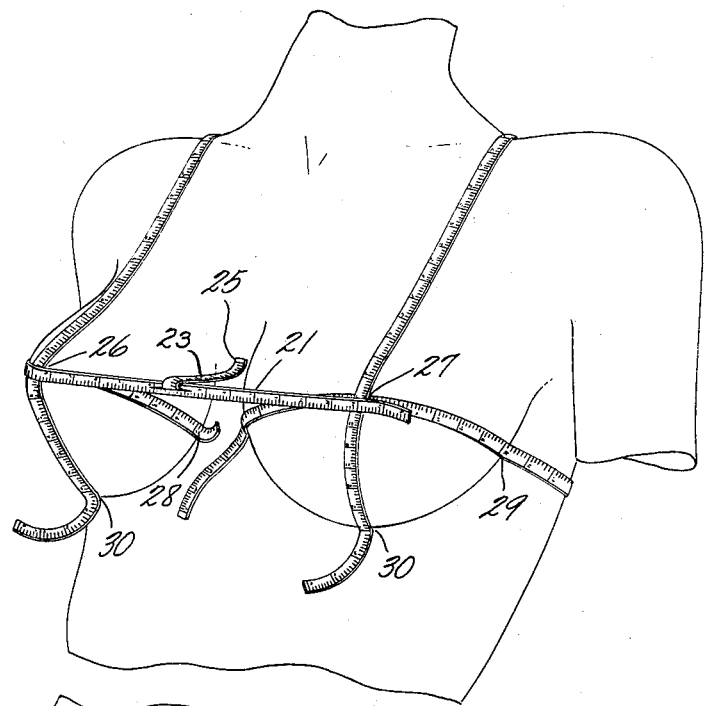
Figure 3:
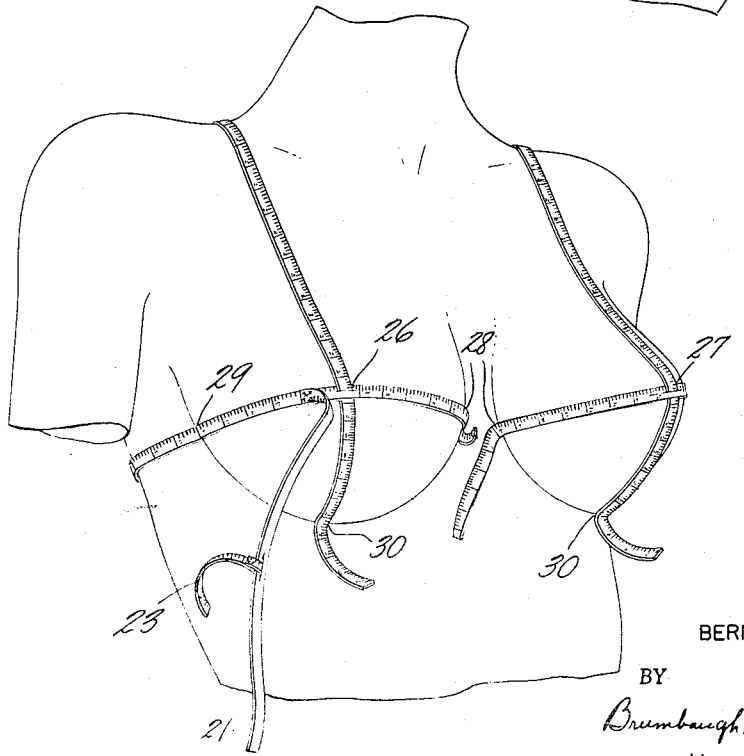

In order that the invention may be understood more fully, it will now be described with reference to the accompanying drawings wherein:

Fig. 1 is a perspective view of a measuring device constructed in accordance with the present invention;

Fig. 2 is a view showing the manner in which the measuring device of Fig. 1 is applied to the bust in order to take the various measurements required to be made; and Fig. 3 is a view somewhat similar to Fig. 2 and showing the manner in which measurements are taken by the device of the present invention with respect to distances from the nipple to the various border line points of the breast muscle.

The device of the present invention comprises a flexible band 10 having suitable calibrations (such as inch measurements) applied thereto, the ends 11 and 12 meeting when the device is applied to the bust to be measured so that the bust measurement may be taken. Attached to the band 10 at points 13 and 14 are shoulder bands 15 and 16, the respective ends 17 and 18 of which are provided with suitable calibrations to enable measurements to be made from the shoulder to the point of the nipple. In order that the bands 15 and 16 may be maintained in assembled relationship with respect to the band 10, slits 19 and 20 are formed in the band 10 to receive the respective shoulder bands 15 and 16. As is illustrated in Figs. 2 and 3, the distances from the shoulder to the nipple are taken by placing the intersections of the shoulder bands 15 and 16 with the bust band 10 over the points of the respective nipples and the appropriate calibrations on the respective shoulder bands observed. These two measurements, together with the bust measurement provided by the ends 11 and 12 of the band 10, may be taken at the same time as the measuring device is located properly in measuring position upon the bust.

In order that further measurements may be taken, the band 10 is provided with an auxiliary band 21 which may be secured at the point 22 to the band 10. The measuring strip or band 21 is suitably calibrated as mentioned in connection with the bands 10, 15 and 16 and serves as a means for taking the measurement of the distance between nipples. This measurement is illustrated in Fig. 2 wherein the band 21 is placed in the proper position for observing this measurement. This distance, of course, is the straight line distance horizontally between the points of the nipples.

Yet another tape or band 23 is provided, being secured to the band 21 in a slit 24 in order that it may have some facility for lateral adjustment. The purpose of the tape 23 (which is provided with calibrations as previously mentioned in connection with the other tapes or bands) is to record the measurement between a straight line intersecting the nipple points and the point of the bust between the breasts. This distance is generally referred to as the valley, and its measurement is illustrated in Fig. 2 wherein the tape 23 extends from the tape 21 to a point indicated at 25 which is the proper point from which the measurement is to be taken.

The manner in which the measuring device is used to obtain the required bust measurements is illustrated in Figs. 2 and 3. In those views, the nipple points are indicated at 26 and 27. The median border lines of the breast muscles are indicated at the points 28, the lateral border lines at the points 29, and the lower border lines at the points 30. The measurements for determining cup size with respect to each breast respectively are taken as follows. The distances from the nipples to the median and lateral border lines of the breast muscles are taken by the calibrations on the band 10. Fig. 3 illustrates the manner in which these measurements are made between the respective points 26 and 27 and the border line points 28, 29 of the respective breast muscles (the measurement for the left breast being more completely illustrated in Fig. 2). The distances from the nipples 26 and 27 to the lower border lines of the breast muscles indicated at the points 30 are taken by means of the calibrations on the lower ends of the shoulder bands 15 and 16, as illustrated in both Figs. 2 and 3.

From the foregoing, it will be seen that the device of the present invention serves to provide a means for measuring not only the bust size but, simultaneously, the distances from the shoulder to the nipples, as well as the distances between the nipples and the valley. In addition, accurate measurements are obtained with respect to the distances between the nipples and all of the essential border line points of each of the breasts. In this fashion, accurate measurements may be made in order to enable a completely satisfactory garment fit to be attained.

While the invention has been described with reference to the specific device shown in the accompanying drawings, it is not to be limited save as defined in the appended claims.

I claim:

1. A bust measuring device comprising a flexible bust band having calibrated free end sections in the front portion thereof whereby the circumferential dimensions of the bust may be taken, said bust band being formed with slits adjacent the free ends thereof, two shoulder bands secured at spaced points to the bust band intermediate the ends thereof and passing through the slits in the bust band, each of said shoulder bands being a continuously extending unitary element forming a loop supporting the bust band and having calibrations whereby the vertical dimension of the bust from the rear of the bust band to the slits in the front portion thereof may be measured, and a calibrated tape secured to the bust band adjacent one of the slits therein adapted to provide a measurement of the straight line distance between the nipples.

2. A bust measuring device comprising a flexible bust band formed with slits adjacent the ends thereof and having calibrations on at least one end whereby the circumferential dimensions of the bust may be taken, said slits being positioned in the bust band to lie in the front portion thereof when the bust band is in measuring position, two shoulder bands secured at spaced points to the bust band intermediate the ends thereof and passing through the slits in the bust band, each of said shoulder bands being a continuously extending unitary element forming a loop supporting the bust band and having calibrations whereby the vertical dimension of the bust from the rear of the bust band to the slits in the front portion thereof may be measured, a calibrated tape secured to the bust band adjacent one of the slits therein adapted to provide a measurement of the straight line distance between the nipples, and a calibrated strip secured to the last-named tape adapted to provide a measurement of the distance between the straight line between the nipples to the point of the bust between the breast muscles.

3. A bust measuring device comprising a flexible bust band formed with slits adjacent the ends thereof and having calibrations on at least one end whereby the circumferential dimensions of the bust may be taken, said slits being positioned in the burst band to lie in the front portion thereof when the bust band is in measuring position, two shoulder bands secured at spaced points to the bust band intermediate the ends thereof and passing through the slits in the bust band, each of said shoulder bands being a continuously extending unitary element forming a loop supporting the bust band and having calibrations whereby the vertical dimension of the bust from the rear of the bust band to the slits in the front portion thereof may be measured, a calibrated tape secured to the bust band adjacent one of the slits therein adapted to provide a measurement of the straight line distance between the nipples, and a calibrated strip adjustably secured along the length of the last-named tape adapted to provide a measurement of the distance between the straight line between the nipples to the point of the bust between the breast muscles.

4. A bust measuring device comprising a flexible bust band formed with slits adjacent the ends thereof and having calibrations on at least one end, two shoulder bands secured at spaced points to the bust band intermediate the ends thereof and passing through the slits in the bust band, each of said shoulder bands being a continuously extending unitary element forming a loop supporting the bust band, and the said shoulder bands and bust band being adapted to lie on a subject in the position of the supporting straps of a brassiere, a calibrated tape secured to the bust band adjacent one of the slits therein and a calibrated strip secured to the last-named tape.

5. A bust measuring device comprising a single horizontal band having calibrated free end sections in the front portion thereof whereby the circumferential dimensions of the bust may be taken, said horizontal band being formed with slits adjacent the free ends thereof, not more than two vertical bands secured at spaced points to the horizontal band intermediate the ends thereof and passing through the slits in the horizontal band, each of said vertical bands being a continuously extending unitary element forming a loop supporting the horizontal band and having calibrations whereby the vertical dimension of the bust from the rear of the horizontal band to the slits in the front portion thereof may be measured, a calibrated tape secured to the bust band adjacent one of the slits therein and a calibrated strip secured to the last-named tape.

References Cited in the file of this patent

UNITED STATES PATENTS

| | | |
|---|---|---|
| 57,254 | La Ment | Aug. 14, 1866 |
| 633,654 | Melick | Sept. 26, 1899 |
| 719,924 | Westcott | Feb. 3, 1903 |
| 986,041 | Bond | Mar. 7, 1911 |
| 1,487,509 | Bushlowitz | Mar. 1, 1924 |
| 2,106,729 | Fichtol | Feb. 1, 1928 |
| 2,575,343 | Heiman | Nov. 20, 1951 |